United States Patent [19]
Lee

[11] Patent Number: 5,876,048
[45] Date of Patent: Mar. 2, 1999

[54] EXTENSIBLE DRAW BAR DEVICE

[76] Inventor: Chi-Tsai Lee, 58, Ma Yuan West St., Taichung, Taiwan

[21] Appl. No.: 795,762

[22] Filed: Feb. 6, 1997

[51] Int. Cl.$^6$ .............................. A45C 13/22; B25G 1/04; B62B 1/12

[52] U.S. Cl. .................... 280/47.315; 16/115; 190/18 A; 190/115; 280/47.371

[58] Field of Search ......................... 16/115; 280/47.315, 280/47.371, 655, 37, 655.1; 190/18 A, 115, 39; 403/109, 377, 100, 102, 325, 330, 326, 327; 135/25.4, 75; 248/188.5

[56] References Cited

U.S. PATENT DOCUMENTS

| | | | |
|---|---|---|---|
| 5,379,486 | 1/1995 | Wang | 16/115 |
| 5,431,428 | 7/1995 | Marchwiak et al. | 190/18 A |
| 5,458,020 | 10/1995 | Wang | 403/109 |
| 5,488,756 | 2/1996 | Hsieh | 16/115 |
| 5,502,876 | 4/1996 | Wang | 16/115 |
| 5,584,097 | 12/1996 | Lu | 16/115 |
| 5,644,816 | 7/1997 | Chou | 280/47.315 |
| 5,653,319 | 8/1997 | Wang | 280/655 |
| 5,694,663 | 12/1997 | Tserng | 16/115 |
| 5,704,725 | 1/1998 | Horing | 190/18 A |

*Primary Examiner*—Douglas C. Butler

[57] ABSTRACT

An extensible draw bar device comprises a pair of outer pipes, a pair of middle pipes disposed in the corresponding outer pipes respectively, a pair of longitudinal inner pipes disposed in the corresponding middles pipes respectively, and a pair of press rods disposed in the corresponding inner pipes respectively. A transverse crossbar has two ends to receive two hollow plug seats respectively. The hollow plug seats receive two upper ends of two press rods respectively. The hollow plug seats are inserted in two upper ends of the two inner pipes respectively. An upper connecting seat has two hollow arms to receive two upper ends of the two outer pipes respectively. A lower connecting seat crosses the lower ends of the two outer pipes respectively. The upper connecting seat and the lower connecting seat connect a suitcase. Two wheel are disposed at the lower end of the lower connecting seat respectively.

2 Claims, 4 Drawing Sheets

EXTENSIBLE DRAW BAR DEVICE

BACKGROUND OF THE INVENTION

The invention relates to a draw bar device. More particularly, the invention relates to an extensible draw bar device for a suitcase.

There are various conventional handles for suitcases. Most extensible handles are not convenient to operate. The user has to use both hands to push the buttons at the same time, and the user should hold the suitcase simultaneously. Thus the user needs an extra hand to operate the conventional extensible handles.

SUMMARY OF THE INVENTION

An object of the invention is to provide an extensible draw bar device which is easily operated with one hand.

Another object of the invention is to provide an extensible draw bar device which is easily assembled.

Accordingly, an extensible draw bar device comprises a pair of longitudinal outer pipes, a pair of longitudinal middle pipes disposed in the corresponding outer pipes respectively, a pair of longitudinal inner pipes disposed in the corresponding middles pipes respectively, and a pair of press rods disposed in the corresponding inner pipes respectively. A transverse crossbar has two ends to receive two hollow plug seats respectively. The hollow plug seats receive two upper ends of the two press rods respectively. The hollow plug seats are inserted in two upper ends of the two inner pipes respectively. A button is disposed on a central portion of the transverse crossbar. A first and second oblong holes are formed on an upper and lower portions of each of the outer pipes respectively. A first and second rectangular holes are formed on an upper and lower portions of each of the middle pipes respectively. A rectangular slot is formed on a lower portion of the inner pipe. A socket which is disposed in an interior of the outer pipe receives the lower portion of the inner pipe. A bore is formed on the socket to receive a protruded bar of a click which is disposed in the socket. A coiled spring is disposed at one side of the click, and the protruded bar extends from an opposite side of the click. The protruded bar inserts through the bore and the oblong hole to reach one of the rectangular holes. A shoulder of the click contacts a tip end of a pawl. The pawl is connected to the socket by a pivot pin. A positioning seat has a neck on a front portion of the positioning seat and a post on a rear portion of the positioning seat. An oblong slot and a through hole are formed on the positioning seat. The through hole receives a lower end of the press rod. A snap element of the neck is inserted in the rectangular slot. A sleeve which is disposed in an upper interior of the middle pipes blocks the positioning seat. The oblong slot receives a protruded rod of a detent which is disposed in the positioning seat. An elastic element is disposed at one side of the detent, and the protruded rod extends from an opposite side of the detent. The protruded rod inserts through the oblong slot. A shoulder of the detent contacts a terminal end of a catch. The catch is connected to the positioning seat by a pivot fastener. An upper connecting seat has two hollow arms to receive two upper ends of the two outer pipes respectively. A lower connecting seat crosses the lower ends of the two outer pipes respectively. The upper connecting seat and the lower connecting seat connect a suitcase respectively. Two wheels are disposed at the lower end of the lower connecting seat respectively.

DETAILED DESCRIPTION OF THE INVENTION

Figure 1:
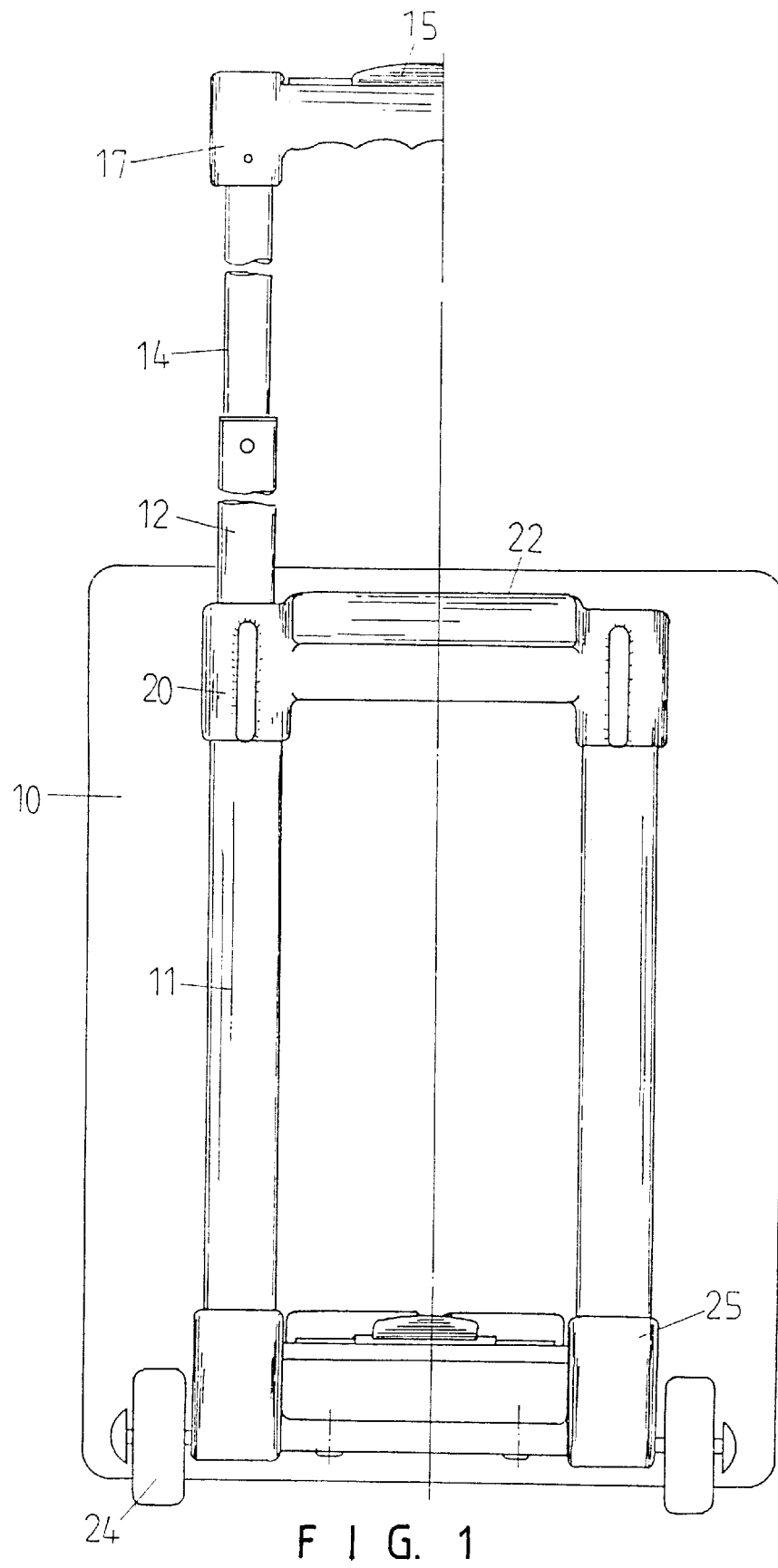
FIG. 1 is an elevational view of an extensible draw bar device of a preferred embodiment in accordance with the invention.

Referring to FIGS. 1 to 5, an extensible draw bar device comprises a pair of longitudinal outer pipes 11, a pair of longitudinal middle pipes 12 disposed in the corresponding outer pipes 11 respectively, a pair of longitudinal inner pipes 14 disposed in the corresponding middles pipes 12 respectively, and a pair of press rods 16 disposed in the corresponding inner pipes 14 respectively. A transverse crossbar 17 has two ends to receive two hollow plug seats 18 respectively. The hollow plug seats 18 receive two upper ends of the two press rods 16 respectively. The hollow plug seats 18 are inserted in two upper ends of the two inner pipes 14 respectively. A button 15 is disposed on a central portion of the transverse crossbar 17.

A first and second oblong holes 110 are formed on an upper and lower portions of each of the outer pipes 10 respectively. A first and second rectangular holes 121 and 120 are formed on an upper and lower portions of each of the middle pipes 12 respectively. A rectangular slot 140 is formed on a lower portion of the inner pipe 14. A socket 60 which is disposed in an interior of the outer pipe 11 receives the lower portion of the inner pipe 14. A bore 61 is formed on the socket 60 to receive a protruded bar 63 of a click 62 which is disposed in the socket 60. A coiled spring 64 is disposed at one side of the click 62, and the protruded bar 63 extends from an opposite side of the click 62. The protruded bar 63 inserts through the bore 61 and the oblong hole 110 to reach one of the rectangular holes 121 and 120. A shoulder of the click 62 contacts a tip end 67 of a pawl 65. The pawl 65 is connected to the socket 60 by a pivot pin 66. A positioning seat 50 has a neck 51 on a front portion of the positioning seat 50 and a post 501 on a rear portion of the positioning seat 50. An oblong slot 52 and a through hole 59 are formed on the positioning seat 50. The through hole 59 receives a lower end of the press rod 16. A snap element of the neck 51 is inserted in the rectangular slot 140. A sleeve 70 which is disposed in an upper interior of the middle pipes 12 blocks the positioning seat 50. The oblong slot 52 receives a protruded rod 54 of a detent 53 which is disposed in the positioning seat 50. An elastic element 55 is disposed at one side of the detent 53, and the protruded rod 54 extends from an opposite side of the detent 53. The protruded rod 54 inserts through the oblong slot 52. A shoulder of the detent 53 contacts a terminal end 58 of a catch 56. The catch 56 is connected to the positioning seat 50 by a pivot fastener 57.

Figure 2:
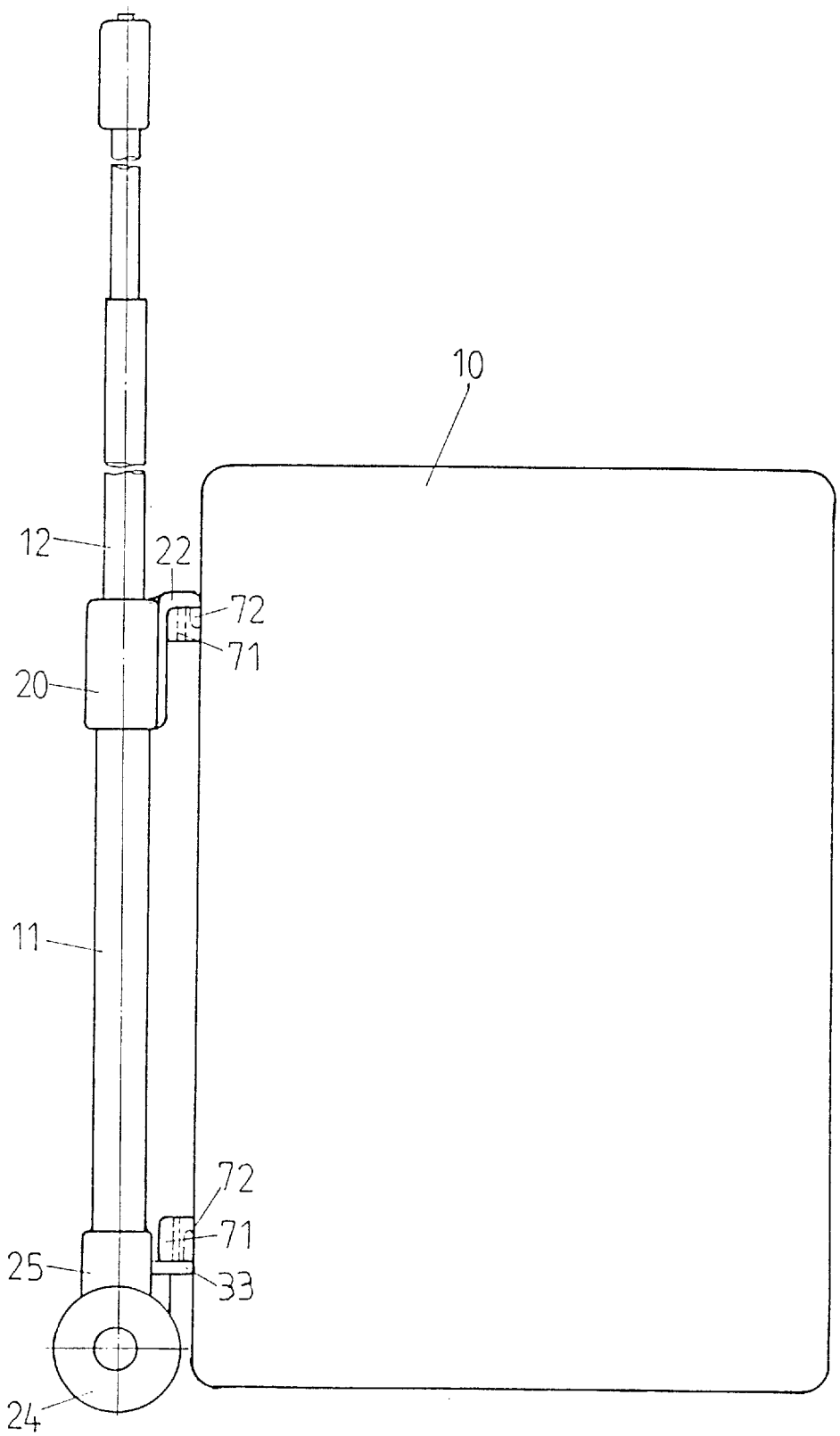
FIG. 2 is another elevational view of an extensible draw bar device of a preferred embodiment in accordance with the invention.
Figure 3:
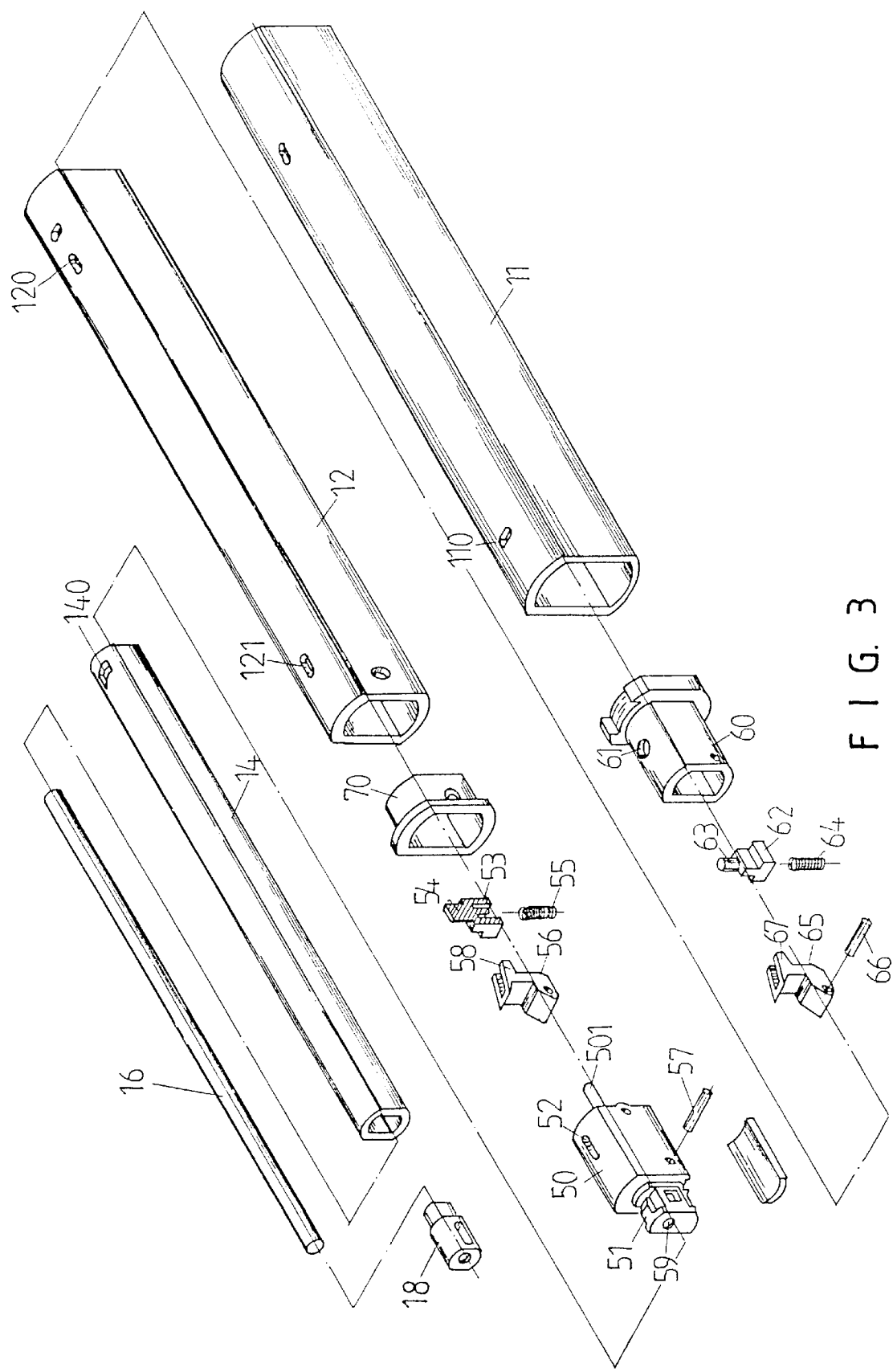
FIG. 3 is a perspective exploded view of an extensible draw bar device.
Figures 4, 5:
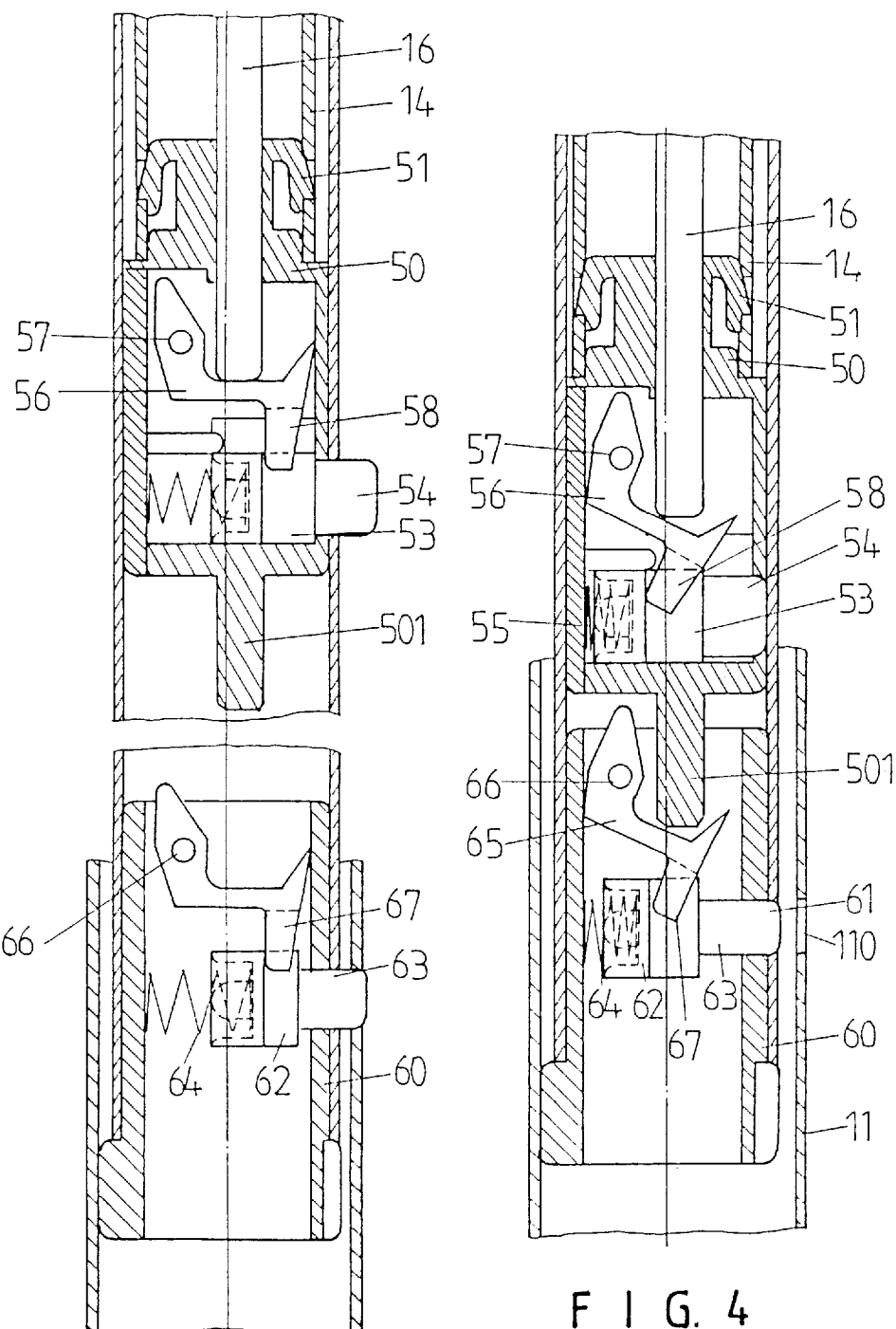
FIG. 4 is a sectional view of an extensible draw bar device.
FIG. 5 is another sectional view of an extensible draw bar device.

Referring to FIG. 2, an upper connecting seat 22 has two hollow arms 20 to receive two upper ends of the two outer pipes 11 respectively. A lower connecting seat 25 crosses the lower ends of the two outer pipes 11 respectively. The upper connecting seat 22 and the lower connecting seat 25 connect a suitcase 10 respectively. Two wheels 24 are disposed at the lower end of the lower connecting seat 25 respectively. Each of the hollow arms 20 has a hook 72 to be engaged with a protruded block 71 of the suitcase 10. The lower connecting seat 25 has two hooks 72 to be engaged with two protruded blocks 71 of the suitcase 10.

The invention is not limited to the above embodiment but various modification thereof may be made. It will be understood by those skilled in the art that various changes in form and detail may be made without departing from the scope of the invention.

I claim:

1. An extensible draw bar device comprising:

a pair of longitudinal outer pipes, a pair of longitudinal middle pipes disposed in the corresponding outer pipes respectively, a pair of longitudinal inner pipes disposed in the corresponding middles pipes respectively, and a pair of press rods disposed in the corresponding inner pipes respectively, a transverse crossbar having two ends to receive two hollow plug seats respectively, the hollow plug seats receiving two upper ends of the two press rods respectively, the hollow plug seats inserted in two upper ends of the two inner pipes respectively, a button disposed on a central portion of the transverse crossbar, a first and second oblong holes formed on an upper and lower portions of each of the outer pipes respectively, a first and second rectangular holes formed on an upper and lower portions of each of the middle pipes respectively, a rectangular slot formed on a lower portion of the inner pipe, a socket which is disposed in an interior of the outer pipe receiving the lower portion of the inner pipe, a bore formed on the socket to receive a protruded bar of a click which is disposed in the socket, a coiled spring disposed at one side of the click, the protruded bar extending from an opposite side of the click, the protruded bar inserting through the bore and the oblong hole to reach one of the rectangular holes, a shoulder of the click contacting a tip end of a pawl, the pawl connected to the socket by a pivot pin, a positioning seat having a neck on a front portion of the positioning seat and a post on a rear portion of the positioning seat, an oblong slot and a through hole formed on the positioning seat, the through hole receiving a lower end of the press rod, a snap element of the neck inserted in the rectangular slot, a sleeve which is disposed in an upper interior of the middle pipes blocking the positioning seat, the oblong slot receiving a protruded rod of a detent which is disposed in the positioning seat, an elastic element disposed at one side of the detent, the protruded rod extending from an opposite side of the detent, the protruded rod inserting through the oblong slot, a shoulder of the detent contacting a terminal end of a catch, the catch connected to the positioning seat by a pivot fastener, an upper connecting seat having two hollow arms to receive two upper ends of the two outer pipes respectively, a lower connecting seat crossing the lower ends of the two outer pipes respectively, the upper connecting seat and the lower connecting seat connected to a suitcase, respectively.

2. An extensible draw bar device as claimed in claim 1 wherein two wheels disposed at the lower end of the lower connecting seat respectively.

* * * * *